United States Patent
Lewis (10) Patent No.: US 11,879,539 B2
(45) Date of Patent: Jan. 23, 2024

(54) LUBRICATION SYSTEM

(71) Applicant: AERO GEARBOX INTERNATIONAL, Colombes (FR)

(72) Inventor: Nathan Lewis, Moissy-Cramayel (FR)

(73) Assignee: AERO GEARBOX INTERNATIONAL, Colombes (FR)

( * ) Notice: Subject to any disclaimer, the term of this patent is extended or adjusted under 35 U.S.C. 154(b) by 406 days.

(21) Appl. No.: 17/343,450

(22) Filed: Jun. 9, 2021

(65) Prior Publication Data
US 2021/0388896 A1     Dec. 16, 2021

(30) Foreign Application Priority Data
Jun. 10, 2020 (FR) ...................................... 2006051

(51) Int. Cl.
*F16H 57/04* (2010.01)
(52) U.S. Cl.
CPC ......... *F16H 57/043* (2013.01); *F16H 57/046* (2013.01); *F16H 57/0434* (2013.01)
(58) Field of Classification Search
CPC .. F16H 57/046; F16H 57/043; F16H 57/0434; F16N 9/02; F16N 2210/02; F16N 2210/12; F01D 15/12; F01D 25/18; F02C 7/06; F02C 7/36; F05D 2240/61; F05D 2240/63; F05D 2260/98
USPC ................................................. 184/6.11, 6.12
See application file for complete search history.

(56) References Cited

U.S. PATENT DOCUMENTS

| 3,621,937 | A | * | 11/1971 | Edge | ........................ | F01D 25/18 |
|---|---|---|---|---|---|---|
| | | | | | | 60/39.08 |
| 3,847,248 | A | * | 11/1974 | Avery | ..................... | F16D 1/116 |
| | | | | | | 220/521 |
| 3,990,538 | A | * | 11/1976 | Casey | ........................ | F16N 7/00 |
| | | | | | | 464/16 |
| 5,119,905 | A | * | 6/1992 | Murray | ................... | F16N 21/00 |
| | | | | | | 464/7 |
| 2011/0129291 | A1 | | 6/2011 | Humes | | |

FOREIGN PATENT DOCUMENTS

| FR | 2543654 A1 | 10/1984 |
|---|---|---|
| FR | 2977280 A1 | 1/2013 |

OTHER PUBLICATIONS

French Search Report in corresponding French Patent Application No. 2006051, dated Jan. 11, 2021 (2 pages).

* cited by examiner

*Primary Examiner* — Michael R Mansen
*Assistant Examiner* — Mark K Buse
(74) *Attorney, Agent, or Firm* — Bookoff McAndrews, PLLC

(57) ABSTRACT

An insert for supplying a fluid to splines of a drive shaft, the insert comprising an insert wall extending between a first end and a second end of the insert, a chamber surrounding the insert wall for storing a fluid, a piston having a surface configured to be exposed to the fluid, the piston configured to move between a first position and a second position within the chamber, and the piston biased toward the first position, and wherein an increase in supply of the fluid in the chamber causes the piston to move toward the second position and a decrease in supply of the fluid in the chamber causes the piston to move toward the first position.

15 Claims, 6 Drawing Sheets

LUBRICATION SYSTEM

CROSS-REFERENCE TO RELATED APPLICATIONS

This applications claims benefit to French Patent Application No. 2006051, filed on Jun. 10, 2020, which is incorporated herein by reference in its entirety.

FIELD

The present disclosure relates generally to the field of lubrication systems within a gearbox. More specifically, the present disclosure relates to a lubrication system within a drive shaft of an accessory gearbox.

BACKGROUND

A turbine engine of an aircraft typically includes an accessory gearbox for powering mechanically driven accessory systems, such as fuel pumps, hydraulic pumps, and electrical generators, which are essential to operation of the engine and the aircraft. As is disclosed by French Patent Application FR2977280A1 (hereafter, "the '280 application"), the accessory gear box may usually include one or more gear trains. Each gear train may usually be made up of a plurality of gearwheels that may be driven in rotation to drive the accessories by a power transmission shaft. The power transmission shaft may be coupled to a shaft of the turbine. Each accessory may include an accessory drive shaft including one or more sets of splines which mesh with a corresponding set of splines of a corresponding gearwheel in order to be driven thereby. Additionally, the power transmission shaft may include one or more sets of splines which mesh with a corresponding set of splines of a corresponding gearwheel in order to drive the gearwheels of the gear train.

In operation, lubrication of the of the moving parts within the gearbox, such as the splines, is required in order to cool, reduce friction, and thus optimize functionality and lifetime of the gearbox. However, many currently available lubrication systems, particularly one-shot lubrication systems, are not capable of supplying an adequate amount of lubrication in order to supply lubrication to a centerline of an accessory drive shaft, and thus to another set of splines further down the accessory drive shaft and/or a mating drive shaft.

It is desirable to provide an improved system for lubricating moving parts within a gearbox which is capable of increasing the amount of lubricant to be supplied to moving parts within the gearbox in order to solve one or more technical problems described above.

SUMMARY

According to aspects of the disclosure an insert for supplying a fluid to splines of a drive shaft, the insert comprising an insert wall extending between a first end and a second end of the insert, a chamber surrounding the insert wall for storing a fluid, a piston having a surface configured to be exposed to the fluid, the piston configured to move between a first position and a second position within the chamber, and the piston biased toward the first position, and wherein an increase in supply of the fluid in the chamber causes the piston to move toward the second position and a decrease in supply of the fluid in the chamber causes the piston to move toward the first position.

According to aspects of the disclosure, the insert is configured to rotate around an axis of rotation.

According to aspects of the disclosure, the increase in supply of the fluid in the chamber causes pressure to be exerted on the surface of the piston.

According to aspects of the disclosure, the piston moves axially along an outer surface of the insert wall.

According to aspects of the disclosure, movement of the piston toward the first position forces the fluid out of the chamber.

According to aspects of the disclosure, the insert includes a bias member positioned between the insert wall and the piston, and the bias member is configured to transition between an extended state and a compressed state.

According to aspects of the disclosure, the surface of the piston is annular.

According to aspects of the disclosure, the piston is configured to seal against the insert wall.

According to aspects of the disclosure, the insert includes a nozzle configured to discharge a jet of the fluid.

According to aspects of the disclosure, the nozzle is configured to supply the fluid to the chamber.

According to aspects of the disclosure, a system for supplying a fluid to splines of a drive shaft comprises a drive shaft including splines and a weir positioned adjacent the splines, the drive shaft configured to rotate about an axis of rotation, an insert according to any aspect described above, the insert wall extending concentrically with the drive shaft, and wherein an increase in the fluid in the chamber during rotation of the drive shaft causes the piston to move toward the second position and a decrease in the fluid in the chamber during cessation of rotation of the drive shaft causes the piston to move toward the first position.

According to aspects of the disclosure, the insert is in communication with the weir and the splines at an interface within the drive shaft.

According to aspects of the disclosure, the insert includes the nozzle described above and the nozzle is configured to target the jet of the fluid toward the axis of rotation and through the interface and past the weir to the splines when rotation of the drive shaft is ceased.

According to aspects of the disclosure, the insert is secured to the drive shaft to maintain position and anti-rotation of the insert within the drive shaft.

According to aspects of the disclosure, the piston is configured to seal against a surface surrounding the insert within the drive shaft.

According to aspects of the disclosure, the insert has an outside diameter which is less than an inside diameter of the drive shaft so that a gap is defined between the insert and a surface surrounding the insert within the drive shaft.

According to aspects of the disclosure, the insert is configured to be supplied with the fluid through the nozzle during rotation of the drive shaft.

According to aspects of the disclosure, a method of supplying fluid to splines of a drive shaft comprises steps of providing a drive shaft, the drive shaft having splines and a weir positioned adjacent the splines, providing an insert according to any aspect described above positioned within the drive shaft, the insert being separated from the set of splines by the weir, rotating the drive shaft, supplying fluid to the insert during rotation of the drive shaft, moving the piston of the insert from the first position toward the second position during rotation of the drive shaft, moving the piston from the second position toward the first position during cessation of rotation of the drive shaft, and jetting the fluid supplied to the insert past the weir to the set of splines when rotation of the drive shaft is ceased.

According to aspects of the disclosure, the step of supplying fluid to the insert includes determining an amount of fluid to be supplied dependent upon a diameter of the weir.

According to aspects of the disclosure, the step of supplying fluid to the insert includes determining an amount of fluid to be supplied dependent upon an inside diameter of the insert.

According to aspects of the disclosure, the step moving the insert from the second position toward the first position includes settling the fluid within the insert to a collapsed volume of fluid.

In the manner described and according to aspects illustrated herein, the insert, the system, and the method are configured to increase an amount of fluid supplied to moving parts within a gearbox, such that fluid is supplied to splines of the drive shaft, splines of an accessory drive shaft, a centerline of an accessory drive shaft, and/or to another set of splines further down the accessory drive shaft and/or a mating drive shaft.

BRIEF DESCRIPTION OF THE DRAWINGS

Aspects of an embodiment will be described in reference to the drawings, where like numerals reflect like elements.

DETAILED DESCRIPTION

An embodiment of a lubrication system (hereafter, "the system") for use within a gearbox according to aspects of the disclosure will now be described with reference to FIGS. 1-10B, wherein like numerals represent like parts, and will generally be referred to by the reference numeral 10. Particularly, an insert 20 of the system 10 for use within a gearbox according to aspects of the disclosure will be described. Although the system 10 and the insert 20 are described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

Figure 1:
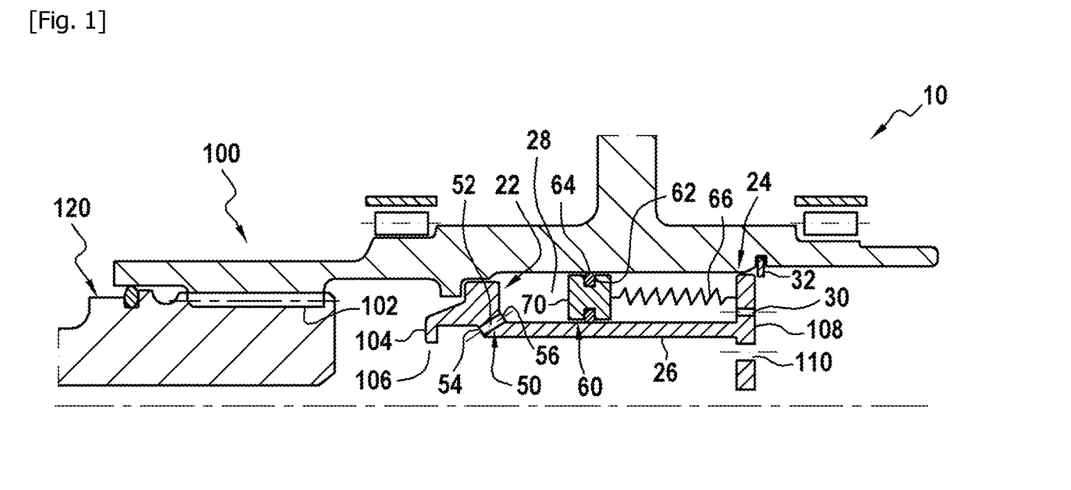
FIG. 1 is a side cross-sectional view of a lubrication system for use in a gearbox (hereafter, "the system") according to aspects of the disclosure.
Figure 2:
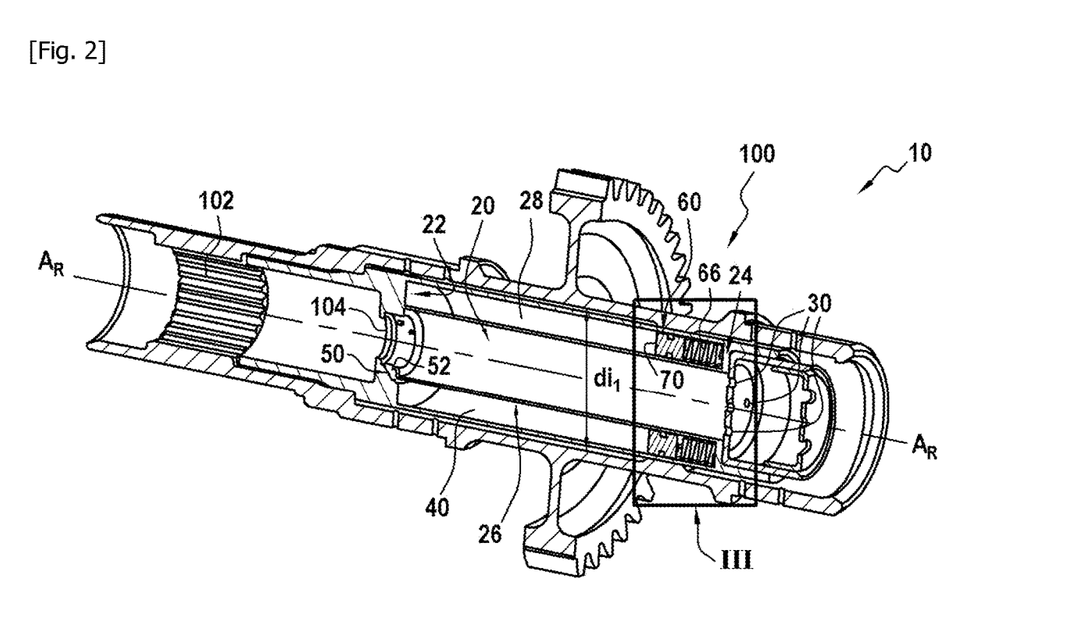
FIG. 2 is a side perspective view of the system of FIG. 1, showing a drive shaft of the system in cross-section, an insert of the system in partial cross-section, a piston of the system in cross-section, and a bias member of the system in cross-section in a compressed state.
Figure 3:
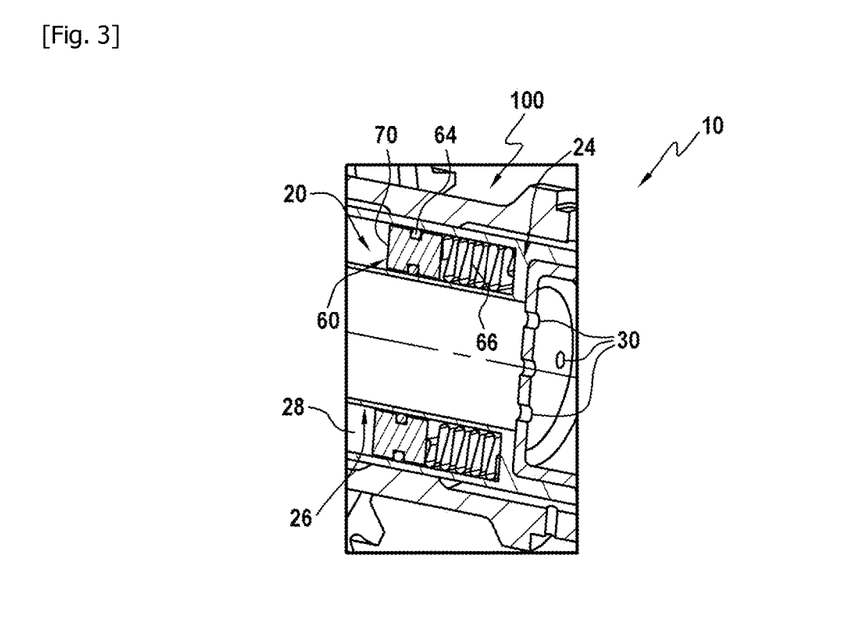
FIG. 3 is an enlarged partial view taken from FIG. 2, with emphasis on the piston and bias member of the system.

As shown in FIG. 1-3, the system 10 is configured for use within a drive shaft (transmission shaft) 100 of an accessory gearbox (hereafter, "the gearbox") (not shown) of an aircraft engine. However, it is contemplated that the system 10 may be configured for use within a non-accessory gearbox. Additionally or alternatively, it is contemplated that the system 10 may be configured for use within a non-aerospace application. The drive shaft 100 has a cycle of operation including a rotating state wherein the drive shaft 100 rotates about an axis of rotation $A_R$ (see FIGS. 2-3, 6-7, and 10B). At completion of the cycle of operation, the drive shaft 100 transitions to a resting state wherein rotation of the drive shaft 100 is ceased (see FIGS. 4-5, 8-9, and 10A).

As shown in FIG. 1, the system 10 is configured to supply a fluid 15 to one or more sets of splines 102 within the gearbox. Additionally, it is contemplated that the fluid 15 may be supplied toward the axis of rotation $A_R$. It is contemplated that the fluid 15 may be supplied to the splines 102 and/or toward the axis of rotation $A_R$ once per operation of the system 10. In the disclosed embodiment, the fluid 15 is a lubricant configured to cool, reduce friction, and thus optimize operation and lifetime of moving parts, such as the splines 102, within the gearbox. Referring to FIGS. 1-3, the splines 102 may be included on or within one or more of the drive shaft 100 and an accessory drive shaft 120. In the disclosed embodiment, the splines 102 are included within the drive shaft 100 and at an end of the accessory drive shaft 120. The system 10 may be configured to supply the fluid to a joint (spline joint) between the splines 102 of the drive shaft 100 and/or the splines 102 of the accessory drive shaft 120. Additionally or alternatively, the splines 102 may be included further down a centerline (center) of the accessory drive shaft 120 and/or on a mating drive shaft. A volume of the fluid 15 to be supplied to the splines 102 by the system 10 may depend upon the length of the splines 102 and/or a diameter and axial length of an area of the drive shaft 100 surrounding the splines 102 where the splines are to be bathed in the fluid 15.

As shown in FIG. 1, the drive shaft 100 may include a first weir 104 positioned within the drive shaft 100. The first weir 104 is configured to obstruct a flow of the fluid 15 from the insert 20 to the splines 102 within the drive shaft 100. The first weir 104 is positioned adjacent to and/or between the splines 102 and a first end 22 of the insert 20. Alternatively, it is contemplated that the first weir 104 may be integrally formed on the insert 20 at the first end 22 of the insert 20. In this alternative arrangement, the drive shaft 100 may include a stop configured to secure positioning of the insert 20 within the drive shaft 100. A first interface 106 may be defined between the first weir 104 and the insert 20. The drive shaft 100 may include a second weir 108 positioned within the drive shaft 100, which is configured to obstruct a flow of the fluid 15 from a supply line (not shown) to the insert 20 within the drive shaft 100. The second weir 108 is positioned adjacent to and/or between the supply line and a second end 24 of the insert 20, which is opposite the first end 22 of the insert 20. A second interface 110 may be defined between the second weir 108 and the insert 20. The insert 20 may be positioned between the first weir 104 and the second weir 108. A volume of the fluid 15 to be supplied within the system 10 may depend upon a diameter and/or height of the first weir 104 and the second weir 108. As such, changes to the diameter and/or height of the first and second weirs 104, 108 may be carried out to control a volume of the fluid 15 to be supplied within the system 10, as well as for ventilation within the system 10 to balance pressure within the system 10.

Figure 10A:
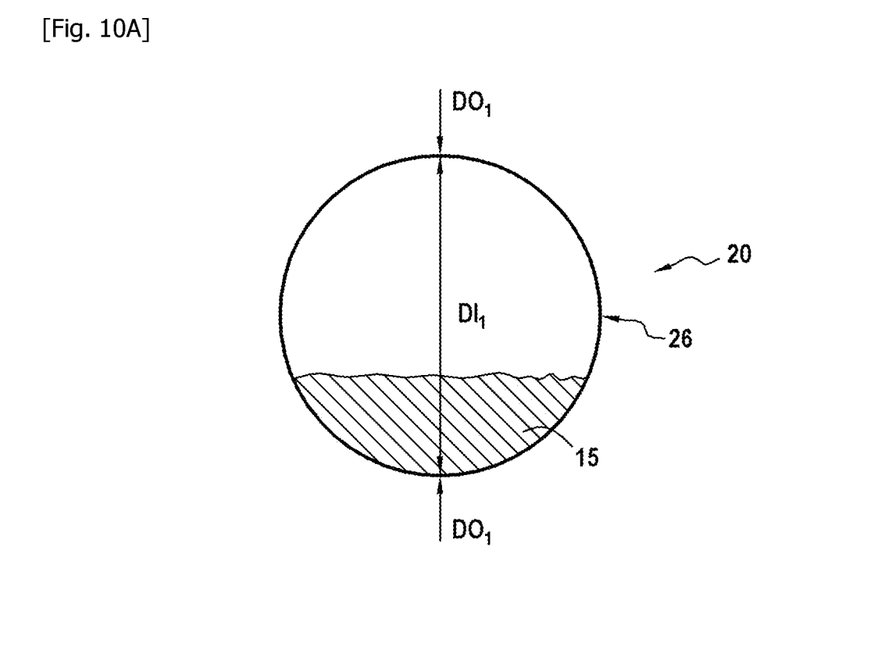
FIG. 10A is a front cross-sectional view of the insert of the system of FIG. 1 during a resting state according to aspects of the disclosure.
Figure 10B:
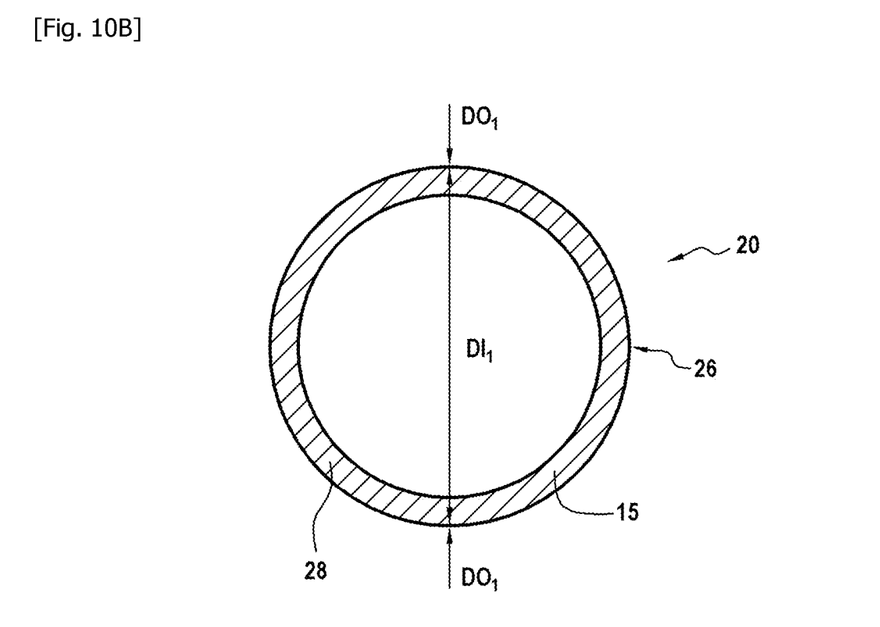
FIG. 10B is a front cross-sectional view of the insert of the system of FIG. 1 during a rotating state according to aspects of the disclosure.

Referring to FIG. 1, the insert 20 of the system 10 is configured to supply the fluid 15 to the splines 102 of the drive shaft 100. Additionally or alternatively, the insert 20 of the system 10 is configured to supply the fluid 15 to the splines 102 of the accessory drive shaft 120 and to the centerline of the accessory drive shaft 120. The insert 20 is configured to be positioned within the drive shaft 100. The insert 20 is configured to rotate around the axis of rotation $A_R$. The insert 20 includes an insert wall 26 extending along axis of rotation $A_R$. The insert wall 26 extends between the first end 22 and the second end 24 of the insert 20. In the disclosed embodiment, the insert wall 26 is cylindrical and extends concentrically within the drive shaft 100 along the axis of rotation $A_R$. As such, the insert wall 26 includes inner and outer surfaces. Referring to FIGS. 1 and 10A-10B, the insert 20 is configured to define a chamber 28. The chamber 28 is defined between the outer surface of the insert wall 26 and the drive shaft 100. However, it is contemplated that the insert 20 may include an additional outer insert wall extending concentrically about the insert wall 26. In this alternative arrangement, the chamber 28 may be defined between the insert wall 26 and the additional outer insert wall, rather than the drive shaft 100. The chamber 28 is configured to store lubricant to supply to the splines 102. The insert 20 defines one or more openings 30 at the second end 24 of the insert 20 for ventilating the insert 20 and/or supplying the fluid 15 to the insert 20. In the disclosed embodiment, the one or more openings 30 may be configured to supply the fluid 15 within the insert wall 26. Additionally or alternatively, the one or more openings 30 may be configured to ventilate the chamber 28.

Referring to FIG. 1, the insert 20 includes a nozzle 50. The nozzle 50 is included at the first end 22 of the insert 20. The nozzle 50 is in communication with the first interface 106 and/or the first weir 104 and the splines 102 of the drive shaft 100, and/or the splines 102 and centerline of the accessory drive shaft 120. The nozzle 50 is also in communication with the chamber 28 of the insert 20. Additionally, the nozzle 50 is in communication with the supply line. The nozzle 50 defines a duct 52 extending through the insert wall 26. The duct 52 extends from a first opening 54 to a second opening 56. The first opening 54 is in communication with the first interface 106 and/or the first weir 104 and the splines 102 of the drive shaft 100, and/or the splines 102 and centerline of the accessory drive shaft 120. As such, the nozzle 50 is configured to target a jet of the fluid 15 stored in the chamber 28 through the interface 106 and past the weir 104 such that the jet of the fluid 15 is supplied to the splines 102 of the drive shaft 100, the splines 102 of the accessory drive shaft 120, and/or to the centerline of the accessory drive shaft 120. Additionally or alternatively, the first opening 54 may be at a first radial distance from the axis of rotation $A_R$ and the second opening 56 may be at a second radial distance from the axis of rotation $A_R$. It is contemplated that the differing radial distances of the first opening 54 and the second opening 56 allow the nozzle 50 to improve targeting of the jet of the fluid 15. The second opening 56 is in communication with the chamber 28. Additionally, the first opening 54 is in communication with the supply line. As such, the nozzle 50 is also configured to be an inlet and/or to supply the fluid 15 to the chamber 28 of the insert 20. Additionally or alternatively, it is contemplated that the insert 20 may include an inlet separate from the nozzle 50. In this alternative arrangement, the inlet includes a one-way valve, such that the fluid 15 may be supplied to the chamber 28 through the inlet but cannot be discharged from the chamber 28 through the inlet.

As shown in FIGS. 1-9, the insert 20 includes a piston 60. The piston 60 is configured to reciprocate within the chamber 28 along the axis of rotation $A_R$. The piston 60 includes a surface 70 configured function as an end wall of the chamber 28. The surface 70 is exposed to the fluid 15 and pressure generated by the fluid 15 within the chamber 28. In the disclosed embodiment, the piston wall 70 and/or the piston 60 is annular. The piston 60 is configured to circumscribe the insert wall 26. The piston 60 includes a seal 64 for sealing against the insert wall 26 and a surface surrounding the insert 60 within the drive shaft 100. In the disclosed embodiment, the piston 60 may seal against the drive shaft 100. However, it is contemplated that the insert 20 may include an additional outer insert wall extending concentrically about the insert wall 26. In this alternative arrangement, the piston 60 may seal against the additional outer insert wall, rather than the drive shaft 100. The piston 60 may include a gland or groove 62 for receiving the seal 64; however, a person having ordinary skill in the art would appreciate that the piston 60 may include other seal arrangements such as an integral seal. The piston 60 is configured to move between a first position and a second position within the chamber 28. The piston 60 is adjacent the first end 22 of the insert 20 in the first position (see FIGS. 4-5 and 8-9) and the piston 60 adjacent the second end 24 of the insert 20 when the piston 60 is in the second position (see FIGS. 2-3 and 6). The insert 20 includes a bias member 66 positioned between the piston 60 and the insert wall 26. In the disclosed embodiment, the bias member 66 is a spring, however, a person having ordinary skill in the art would appreciate that other bias members may be compatible with the system 10. The bias member 66 is configured to compress to a compressed state and to extend to an extended state.

As shown in FIGS. 1-5 of the disclosed embodiment, the bias member 62 may be retained to the insert wall 26 at the second end 24 of the insert 20. In the disclosed embodiment, the bias member 66 is biased toward the extended state. As such, the piston 60 is biased toward the first position. Movement of the piston 60 from the first position toward the second position is configured to compress the bias member 66. Compression of the bias member 66 generates a spring force. Extension of the bias member 66 from the compressed state toward the extended state is configured to move the piston 60 from the second position toward the first position.

Figure 4:
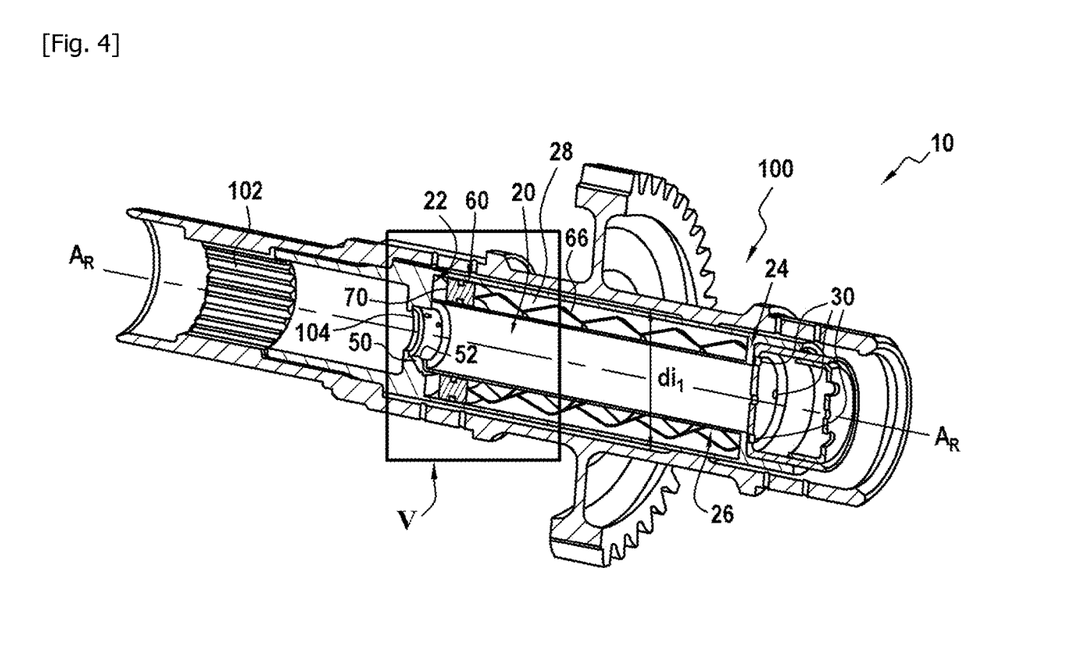
FIG. 4 is a side perspective view of the system of FIG. 1, showing the drive shaft of the system in cross-section, the insert of the system in partial cross-section, the piston of the system in cross-section, and the bias member of the system in cross-section in an extended state.
Figure 5:
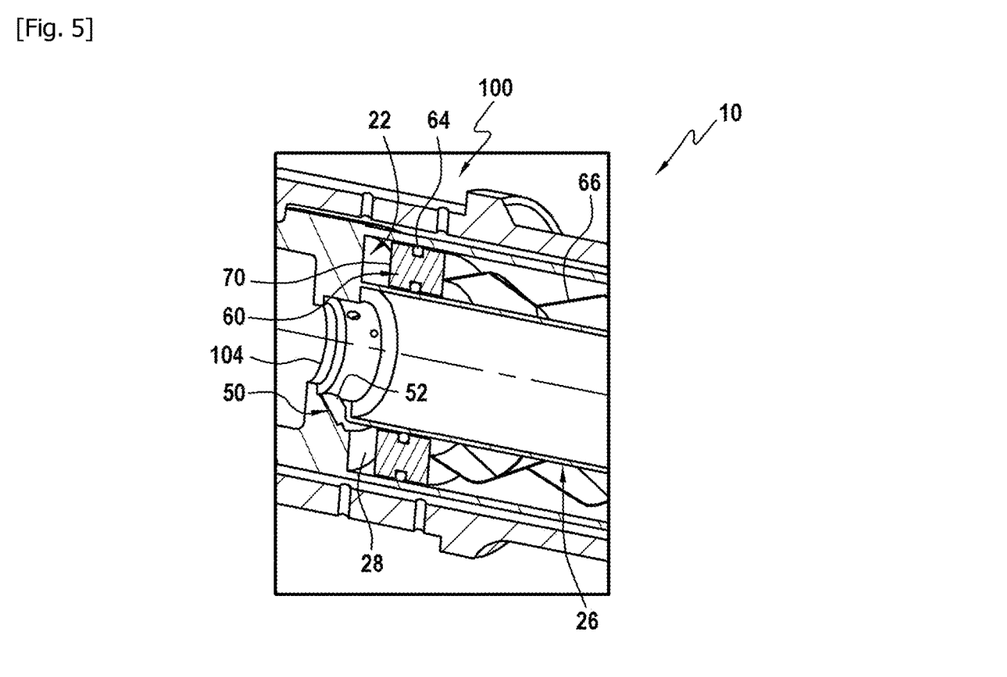
FIG. 5 is an enlarged partial view taken from FIG. 4, with emphasis on the piston and bias member of the system.

The fluid 15 is supplied to the insert 15 through the nozzle 50 during rotation of the drive shaft 100, and thus rotation of the insert 20. As illustrated by FIG. 10B, rotation of the drive shaft 100, and thus rotation of the insert 20, generates a spinning volume of the fluid 15, which exerts a centrifugal force within the chamber 28 of the insert 20. In the disclosed embodiment, the spinning volume of the fluid 15 forms toroidal shape due to the centrifugal force generated by rotation of the drive shaft 100. The centrifugal force of the spinning volume of the fluid 15 increases pressure within the chamber 28. Increased pressure within the chamber 28 increases pressure exerted on the surface 70 of the piston 60 within the chamber 28. Additionally or alternatively, it is contemplated that increase in the fluid 15 within the chamber 28 causes an increase in fluid pressure exerted on the surface 70 of the piston 60. As illustrated by FIGS. 2 and 4 of the disclosed embodiment, the increased pressure on the surface 70 of the piston 60 overcomes the bias member 66 and causes the piston 60 to move from the first position toward the second position. As the piston 60 moves from the first position toward the second position, air is pushed out of the chamber 28 through the opening 30. Movement of the piston 60 from the first position toward the second position compresses the bias member 66 from the extended state toward the compressed state, as the fluid 15 enters through the nozzle 50. As illustrated by FIG. 10A, cessation of rotation of the drive shaft 100, and thus cessation of rotation of the insert 20, settles the spinning volume of the fluid 15 to a collapsed volume of the fluid 15, which reduces exertion of the centrifugal force within the chamber 28 of the insert 20. It is contemplated that the term "cessation of rotation" as used herein may be understood to mean a period in which rotation of the drive shaft 100 slows to the resting state of the drive shaft 100 and/or when rotation of the drive shaft 100 is ceased and/or stopped. Reduction of the exertion of the centrifugal force decreases pressure within the chamber 28. The decreased pressure within the chamber 28 decreases pressure exerted on the surface 70 of the piston 60 within the chamber 28. As such, the decreased pressure within the chamber 28 allows the bias member 66 to overcome the pressure exerted on the surface 70 of the piston 60. The bias member 66 extends from the compressed state toward the extended state, which moves the piston 60 from the second position toward the first position. Movement of the piston 60 from the second position toward the first position forces the fluid 15 out of the nozzle 50 as a jet of the fluid 15.

As shown in FIGS. 6-9, alternatively, the bias member 66 may be retained to the insert wall 26 at the first end 22 of the insert. In the alternative arrangement, the bias member 66 is biased toward the compressed state. As such, the piston 60 is biased toward the first position. Movement of the piston 60 from the first position toward the second position is configured to extend the bias member 66. Extension of the bias member 66 generates a spring force. Compression of the bias member 66 from the extended state toward the compressed state is configured to move the piston 60 from the second position toward the first position.

Figure 6:
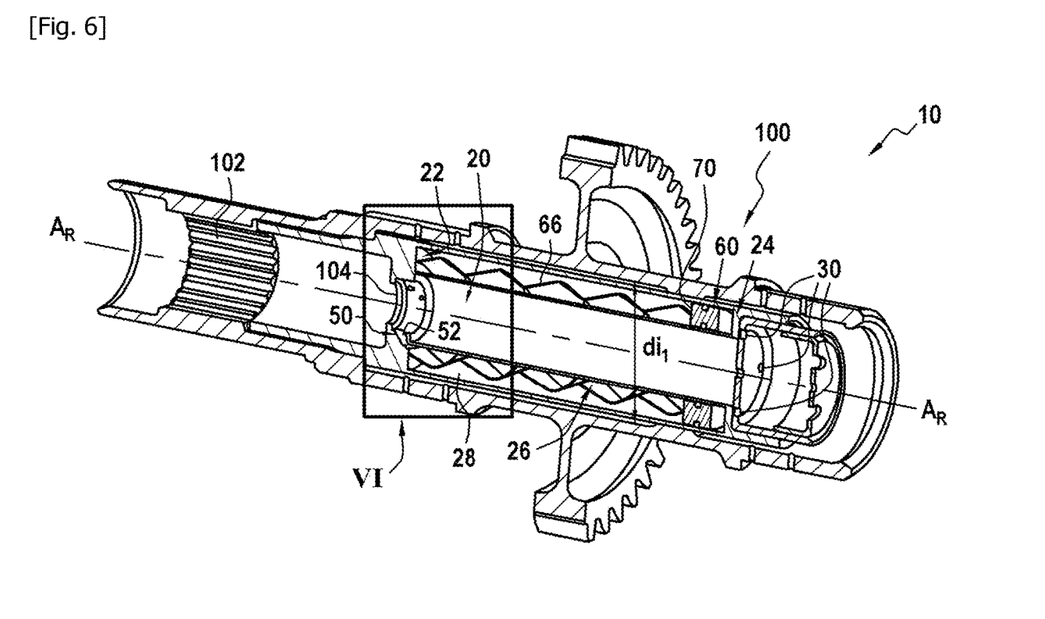
FIG. 6 is a side perspective view of the system according to aspects of the disclosure, showing the drive shaft of the system in cross-section, the insert of the system in partial cross-section, the piston of the system in cross-section, and the bias member of the system in cross-section in the extended state.
Figure 7:
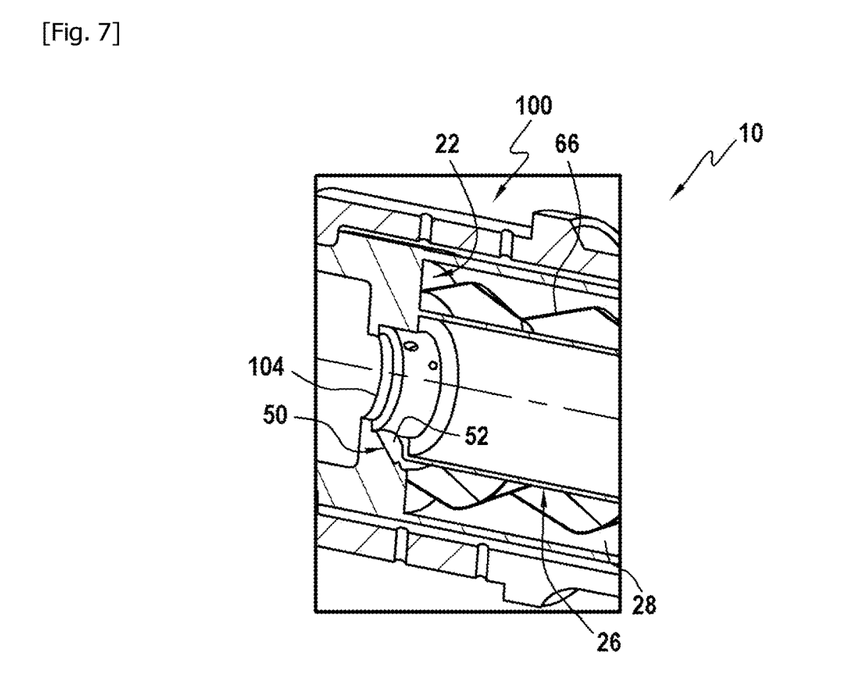
FIG. 7 is an enlarged partial view taken from FIG. 6, with emphasis on the piston and bias member of the system.
Figure 8:
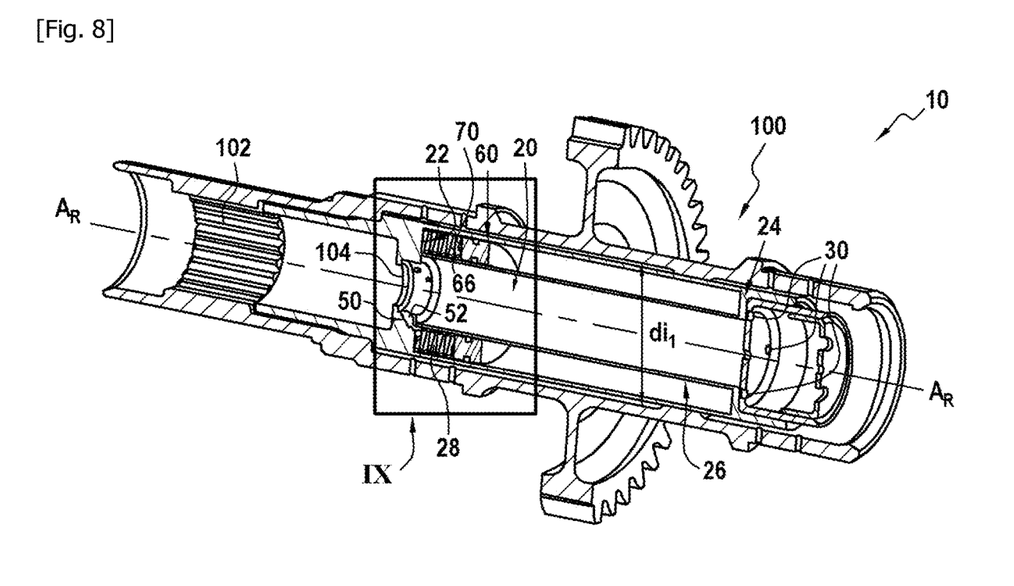
FIG. 8 is a side perspective view of the system of FIG. 6, showing the drive shaft of the system in cross-section, the insert of the system in partial cross-section, the piston of the system in cross-section, and the bias member of the system in cross-section in the compressed state.
Figure 9:
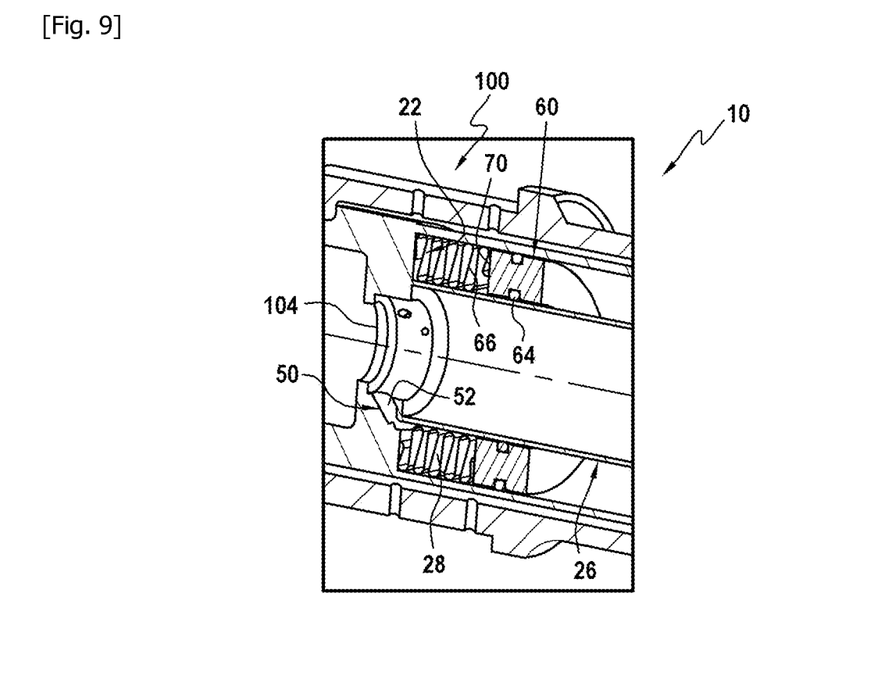
FIG. 9 is an enlarged partial view taken from FIG. 8, with emphasis on the piston and bias member of the system.

As discussed above, the fluid 15 is supplied to the insert 15 through the nozzle 50 during rotation of the drive shaft 100, and thus rotation of the insert 20. Rotation of the drive shaft 100, and thus rotation of the insert 20, generates the spinning volume of the fluid 15, which exerts the centrifugal force within the chamber 28 of the insert 20. The centrifugal force of the spinning volume of the fluid 15 increases pressure within the chamber 28. Increased pressure within the chamber 28 increases pressure exerted on the surface 70 of the piston 60 within the chamber 28. Additionally or alternatively, it is contemplated that increase in the fluid 15 within the chamber 28 causes an increase in fluid pressure exerted on the surface 70 of the piston 60. As shown in FIGS. 6 and 8, the increased pressure on the surface 70 of the piston 60 overcomes the bias member 66 and causes the piston 60 to move from the first position toward the second position. As the piston 60 moves from the first position toward the second position, air is pushed out of the chamber 28 through the opening 30. Movement of the piston 60 from the first position toward the second position extends the bias member 66 from the compressed state toward the extended state, as the fluid 15 enters through the nozzle 50. Cessation of rotation of the drive shaft 100, and thus cessation of rotation of the insert 20, settles the spinning volume of the fluid 15 to the collapsed volume of the fluid 15, which reduces exertion of the centrifugal force within the chamber 28 of the insert 20. Reduction of the exertion of the centrifugal force decreases pressure within the chamber 28. The decreased pressure within the chamber 28 decreases pressure exerted on the surface 70 of the piston 60 within the chamber 28. As such, the decreased pressure within the chamber 28 allows the bias member 66 to overcome the pressure exerted on the surface 70 of the piston 60. The bias member 66 compresses from the extended state toward the compressed state, which moves the piston 60 from the second position toward the first position. Movement of the piston 60 from the second position toward the first position forces the fluid 15 out of the nozzle 50 as a jet of the fluid 15.

As shown in FIGS. 10A-10B, the insert 20 has an inside diameter $DI_1$ and an outside diameter $DO_1$. As shown in FIGS. 2, 6, and 8, the drive shaft 100 has an inside diameter $di_1$. In the disclosed embodiment, the outside diameter $DO_1$ of the insert is smaller than the inside diameter $di_1$ of the drive shaft 100. The difference between the outside diameter $DO_1$ of the insert 20 and the inside diameter $di_1$ of the drive shaft 100 allows for a gap 40 to be defined between the insert 20 and the drive shaft 100. However, it is contemplated that the insert 20 may include an additional outer insert wall extending concentrically about the insert wall 26. In this alternative arrangement, the gap 40 may be defined between the insert wall 26 and the additional outer insert wall. The gap 40 may allow room for the fluid to move between the insert 20 and the drive shaft 100.

Positioning of the insert 20 within the drive shaft 100 is configured to be maintained during the rotating state and the resting state. As shown in FIG. 1, the insert wall 26 may be interference fit and/or press-fit within the drive shaft 100 to maintain position and anti-rotation of the insert 20 within the drive shaft 100. However, it is contemplated that a person having ordinary skill in the art would appreciate that the insert wall 26 may be secured within the drive shaft 100 by other configurations, such as threading, bonding, or adhesion within the drive shaft 100. Additionally or alternatively, the insert 20 may include a snap ring 32 at the second end 24 for maintaining axial retention of the insert 20 within the drive shaft 100. In the disclosed embodiment, the insert wall 26 is rigid. The insert wall 26 may be constructed of steel or aluminum, but it is contemplated that a person having ordinary skill in the art would appreciate that the insert wall 26 may be constructed of any other rigid material which may be compatible with the insert 20.

In operation, the drive shaft 100 transitions from the resting state to the rotating state. The insert 20 is configured to be supplied with the fluid 15 through the nozzle 50 during the rotating state and to supply fluid to the splines 102 through the nozzle 50 during the resting state. During rotation, the fluid 15 is supplied from the supply line to the insert 20. The fluid 15 enters the insert 20 through the first opening 54 of the nozzle 50, travels through the duct 52, and enters the chamber 28 through the second opening 56 of the nozzle. During rotation of the drive shaft 100, the fluid 15 forms the spinning volume within the insert 20 and generates the centrifugal force. The centrifugal force increases pressure within the chamber 28 of the insert 20 which acts on the surface 70 of the piston 60 to move the piston 60 from the first position toward the second position. As the fluid 15 enters the chamber 28, movement of the piston 60 toward the second position extends or compresses the bias member 66. Extending or compressing the bias member 66 creates a spring force, which is harnessed to discharge a targeted jet of the fluid 15 through the nozzle 50 upon completion of the cycle of operation.

At completion of the cycle of operation, the drive shaft 100 transitions from the rotating state to the resting state. During cessation of rotation of the drive shaft 100 and/or when rotation of the drive shaft 100 ceases, the fluid 15 is no longer supplied to the chamber 28 of the insert 20. Additionally, during cessation of rotation of the drive shaft 100 and/or when rotation of the drive shaft 100 ceases, the spinning volume of fluid 15 settles to the collapsed volume of fluid 15. Cessation of rotation of the insert 20 relieves centrifugal pressure of the volume of fluid 15 within the chamber 28 of the insert 20. Relief of pressure within the chamber 28 of the insert 20 causes bias member 66 to extend or compress to move the piston 60 from the second position to the first position. Movement of the piston 60 from the second position to the first position forces a jet of the fluid 15 out of the nozzle 50 toward the splines 102. The jet of the fluid 15 is capable of traveling longer distances, with higher momentum, without dissipating—in contrast to the collapsed fluid 15 depicted in FIG. 10A, which splashes or spills out of the insert 20 and over the first weir 104 and the first interface 106. The nozzle 50 is configured to target the jet of the fluid 15 toward specific areas within the drive shaft 100. The jet of the fluid 15 is discharged through the first interface 106 and past the first weir 104 to the splines 102 of the drive shaft 100, the splines 102 of the accessory drive shaft 120, and/or the centerline of the accessory drive shaft 120. Due to the stronger, targeted flow of the fluid 15 jetting from the nozzle 50, the fluid 15 supplied to the centerline of the accessory drive shaft 120 also reaches other splines 102 which may be present further down on the accessory drive shaft 120.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. An insert for supplying a fluid to splines of a drive shaft, the insert comprising:
   an insert wall extending between a first end and a second end of the insert;

a chamber surrounding the insert wall for storing a fluid;
a piston having a surface configured to be exposed to the fluid, the piston configured to move between a first position and a second position within the chamber, and the piston biased toward the first position; and
wherein, an increase in supply of the fluid in the chamber causes the piston to move toward the second position and a decrease in supply of the fluid in the chamber causes the piston to move toward the first position.

2. The insert of claim 1, wherein the insert is configured to rotate around an axis of rotation.

3. The insert of claim 2, wherein the piston moves axially along an outer surface of the insert wall.

4. The insert of claim 1, wherein increase in supply of the fluid in the chamber causes pressure to be exerted on the surface of the piston.

5. The insert of claim 1, wherein movement of the piston toward the first position forces the fluid out of the chamber.

6. The insert of claim 1, wherein the insert includes a bias member positioned between the insert wall and the piston, and the bias member is configured to transition between an extended state and a compressed state.

7. The insert of claim 1, wherein the surface is annular.

8. The insert of claim 1, wherein the piston is configured to seal against the insert wall.

9. The insert of claim 1, wherein the insert includes a nozzle configured to discharge a jet of the fluid.

10. A system for supplying a fluid to splines of a drive shaft, the system comprising:

a drive shaft including splines and a weir positioned adjacent the splines, the drive shaft configured to rotate about an axis of rotation;
an insert according to claim 1, the insert wall extending concentrically with the drive shaft; and
wherein, an increase in pressure in the chamber during rotation of the drive shaft causes the piston to move toward the second position and a decrease in pressure in the chamber during cessation of rotation of the drive shaft causes the piston to move toward the first position.

11. The system of claim 10, wherein the insert is in communication with the weir and the splines at an interface within the drive shaft.

12. The system of claim 11, wherein the insert includes a nozzle configured to discharge a jet of the fluid and the nozzle is configured to target the jet of the fluid toward the axis of rotation and through the interface and past the weir to the splines when rotation of the drive shaft is ceased.

13. The system of claim 10, wherein the insert is secured to the drive shaft to maintain position and anti-rotation of the insert within the drive shaft.

14. The system of claim 10, wherein the piston is configured to seal against a surface surrounding the insert within the drive shaft.

15. The system of claim 10, wherein the insert has an outside diameter which is less than an inside diameter of the drive shaft so that a gap is defined between the insert and a surface surrounding the insert within the drive shaft.

* * * * *